June 19, 1934.  C. L. EKSERGIAN  1,963,230

WIRE WHEEL

Filed Feb. 7, 1931

INVENTOR.
CAROLUS L. EKSERGIAN
BY
John P. Tarbox
ATTORNEY.

Patented June 19, 1934

1,963,230

UNITED STATES PATENT OFFICE 1,963,230

WIRE WHEEL

Carolus L. Eksergian, Detroit, Mich., assignor to Budd Wheel Company, Philadelphia, Pa., a corporation of Pennsylvania Application February 7, 1931, Serial No. 514,090

4 Claims. (Cl. 301—59)

My invention relates to the art of wire wheels and is particularly concerned with the problem of the production of a simple and inexpensive welded wire wheel affording adequate provision for the crossing of successive spokes of any given series. This problem is particularly acute in connection with wire wheels in which the spokes are welded directly to radially extending portions of the hub shell through a substantial line contact therewith and my solution for the problem has accordingly been illustrated in connection with such a wheel, although it is applicable in many of its aspects to other types of wheel.

A further object of my invention has been to produce a wheel of this type affording provision for mounting the rim inwardly of the region of the hub shell, thus affording interchangeability between my improved wire wheel and a convex disc wheel without changing the plane of tread of the vehicle.

The manner in which I have achieved the above objects and other objects will be apparent from a reading of the subjoined specification in the light of the attached drawing, in which Figure 1 is a central axial section through the wire wheel of my invention as attached to a vehicle hub.

Figure 1:
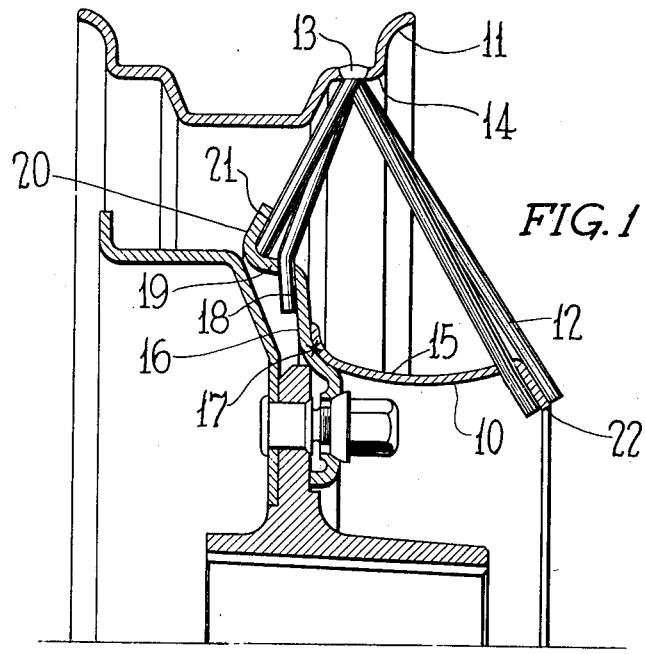

Referring to Figure 1 by reference characters, the numeral 10 indicates a hub shell which is connected to a rim 11, which is preferably of the drop center type, by means of a plurality of spokes 12 which are arranged in two axially spaced series in their connection to the hub shell. The spokes are each provided with heads 13 adapted to be received in openings in the rim, these openings being provided in the present case in the the outer axial regions of the rim in order to space the plane of tread of the wheel inwardly of the hub shell. In the present instance, the spokes are secured within the bead seating shoulder portion 14 of the drop center rim.

My improved hub shell consists of a main body portion 15 and an attaching flange 16, these parts being shown as formed of two separate sheet metal rings spot welded together through substantially radially extending portions as indicated at 17. The spokes 12 are line welded over a substantial portion of their extent adjacent their inner radial extremities to substantially radially extending portions of the hub shell, the outer axial series of spokes being secured to opposite sides of a radially extending flange 22. The welding of the spokes to the opposite sides of this hub flange spaces them apart in their inner radial regions and thus affords adequate provision for their crossing intermediate the hub and rim.

The inner series of spokes are likewise secured to radially extending portions of the hub shell, portions of the hub shell being axially and radially offset in order to receive the spokes at axially spaced points and thereby afford provision for crossing of this inner set of spokes, alternate spokes being fastened to the respective spaced zones of securement. Thus certain of the spokes are secured to the inner side of a radially extending portion of the attaching flange 16 directly outwardly of the line of weld 17 as indicated at 18, these spokes being passed through openings in the hub shell formed to receive them. The attaching flange is turned axially inwardly beyond this zone of securement 18 as indicated at 19 and terminates in an outwardly radially extending flange 20. A second plurality of spokes of the inner series is welded to this flange 20 as indicated at 21, preferably upon the outer side thereof. As indicated above, successive spokes are welded to alternate flanges.

It will be obvious that I have produced a wheel which not only permits the spacing of the plane of tread of the tire inwardly of the hub shell but that I have also devised an arrangement in which the spokes may be line welded to hub shell portions without interfering with the proper spoke crossing found so desirable from a standpoint of structural characteristics and appearance in such a wheel.

Figure 2:
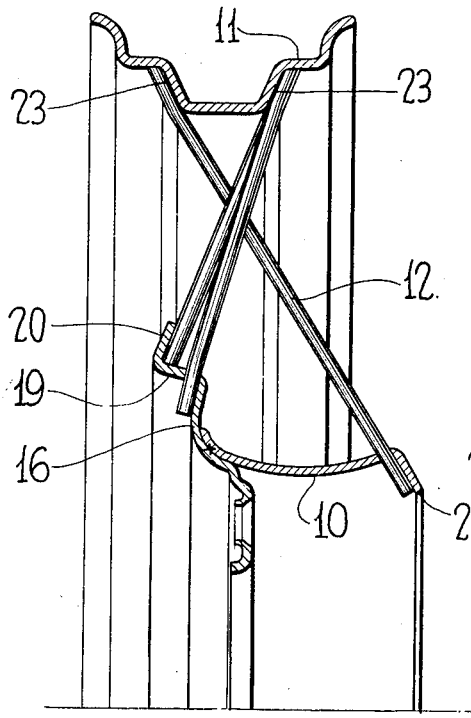
Figure 2 is a central axial view through a wire wheel embodying the principal features of my invention but illustrating a modified type of spoke and rim connection.

The modification of Figure 2 is similar in general to that of Figure 1 but in this form of the invention I have illustrated an arrangement in which the spokes are welded to both the hub and rim, the spokes in this case being line welded directly to the sides of the drop center portion of the rim as indicated at 23.

Figure 3:
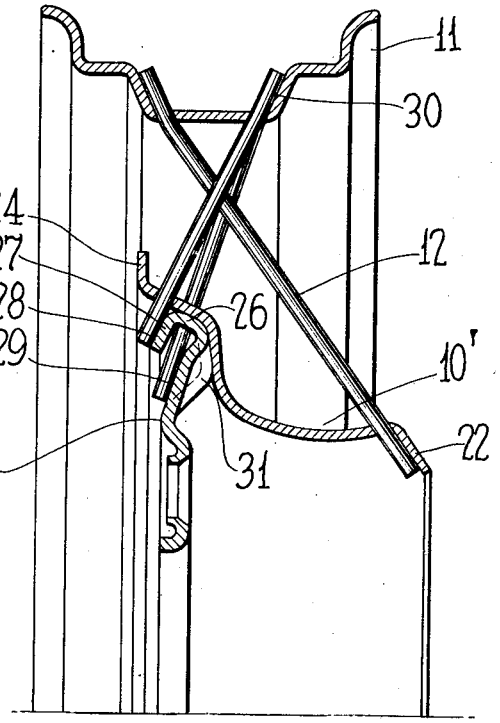
Figure 3 is a view similar to Figure 2 illustrating a still further type of spoke and rim connection and a modified type of hub shell.

In Figure 3 I have illustrated a further modified form of my invention in which the ends of the spokes are entirely concealed by portions of the hub shell and rim. In this case the outer ends of the spokes are passed through openings in the drop center portion of the rim and line welded to the inner sides thereof as indicated at 30. The hub shell 10' in this case is provided with a rearwardly extending portion 24 adapted to project beyond the attaching ring 25 which serves to demountably secure the wheel to a vehicle hub. The attaching ring is turned rearwardly as indicated at 26 to form a portion telescoping with the main body portion 10' and is secured to the body portion in this region. The ring is also ribbed as indicated at 31, the ribs extending outwardly into contact with a radially extending portion of the hub shell and being preferably welded thereto in this region also. The attaching ring is turned radially inwardly at 27 to provide a radially extending portion for the securement of one set of spokes as indicated at 28, the second set of spokes being secured directly to the main body of the attaching ring at 29. The hub shell parts are, of course, suitably perforated to allow these spokes to pass therethrough. In this case, as in the modification of Figure 2, I have illustrated but a single outer set of spokes, and these spokes pass through an outer portion of the hub shell and are welded to an inner surface of the flange 22. In the modification of Figure 3 it will be seen that the welded joints between the spokes and the hub and rim respectively are entirely concealed behind other portions of these members.

Modifications will be obvious to those skilled in the art and I do not therefore wish to be limited except by the scope of my sub-joined claims as interpreted in the light of the generic spirit of my invention.

I claim:

1. A vehicle wheel comprising in combination, a hub shell and rim interconnected by wire spokes, said hub shell including an attaching ring having a radially directed portion, an axially inwardly directed portion at the outer radial extremity of said first-named portion and a second radially directed portion at the axial inner extremity of said axially inwardly directed portion, a plurality of spokes being welded along lines of substantial extent to the first-named radially directed portion of the hub shell and a second plurality of spokes being welded along lines of substantial extent to the last-named radially directed portion of the hub shell, said first and second named plurality of spokes being adapted to cross each other between the hub shell and rim.

2. A vehicle wheel comprising in combination, a hub shell and rim interconnected by wire spokes, said hub shell including an attaching ring having a radially directed portion, an axially inwardly directed portion at the outer radial extremity of said first-named portion and a second radially and outwardly directed portion at the axial inner extremity of said axially inwardly directed portion, a plurality of spokes being welded along lines of substantial extent to the first-named radially directed portion of the hub shell and a second plurality of spokes being welded along lines of substantial extent to the last-named radially directed portion of the hub shell.

3. A vehicle wheel comprising in combination, a hub shell and rim interconnected by wire spokes, said hub shell including an attaching ring having a radially directed portion, an axially inwardly directed portion at the outer radial extremity of said first-named portion and a second radially and inwardly directed portion at the axial inner extremity of said axially inwardly directed portion, a plurality of spokes being welded along lines of substantial extent to the first-named radially directed portion of the hub shell and a second plurality of spokes being welded along lines of substantial extent to the last-named radially directed portion of the hub shell.

4. A vehicle wheel comprising, in combination, a hub member, a rim member and series of spokes interconnecting said hub and rim members, the spokes of each of said series being line welded to axially spaced portions of said hub member, the alternate spokes of one of said series being line welded to axially and circumferentially spaced radially extending portions of said hub member and radially spaced zones thereupon, and the spokes of all of said series being secured to said rim member in an annular zone axially spaced from the central plane of said rim member.

CAROLUS L. EKSERGIAN.